US009607043B2

(12) United States Patent
Nguyen et al.

(10) Patent No.: US 9,607,043 B2
(45) Date of Patent: Mar. 28, 2017

(54) PEAK DATA FEDERATION MULTIZONE SPLITTING

(71) Applicant: Red Hat, Inc., Raleigh, NC (US)

(72) Inventors: Filip Nguyen, Brno (CZ); Filip Elias, Vysni Lhoty (CZ)

(73) Assignee: Red Hat, Inc., Raleigh, NC (US)

( * ) Notice: Subject to any disclaimer, the term of this patent is extended or adjusted under 35 U.S.C. 154(b) by 258 days.

(21) Appl. No.: 14/472,071

(22) Filed: Aug. 28, 2014

(65) Prior Publication Data
US 2016/0063060 A1    Mar. 3, 2016

(51) Int. Cl.
G06F 17/30    (2006.01)
H04L 12/803    (2013.01)
H04L 29/08    (2006.01)

(52) U.S. Cl.
CPC .. *G06F 17/30477* (2013.01); *G06F 17/30566* (2013.01); *H04L 67/10* (2013.01); *H04L 47/125* (2013.01)

(58) Field of Classification Search
CPC ......... G06F 17/30477; G06F 17/30566; H04L 47/125; H04L 67/10
See application file for complete search history.

(56) References Cited

U.S. PATENT DOCUMENTS

| | | | |
|---|---|---|---|
| 6,349,307 B1 * | 2/2002 | Chen ................... | G06F 17/3071 |
| 6,748,393 B1 | 6/2004 | Kapoor et al. | |
| 6,760,719 B1 * | 7/2004 | Hanson ............. | G06F 17/30445 |
| 7,150,022 B2 | 12/2006 | Shutt et al. | |
| 7,281,000 B2 | 10/2007 | Kapoor et al. | |
| 7,457,810 B2 | 11/2008 | Breining et al. | |
| 7,702,636 B1 * | 4/2010 | Sholtis .............. | G06F 17/30566 |
| | | | 707/999.1 |
| 8,706,756 B2 * | 4/2014 | Wu ................... | G06F 17/30545 |
| | | | 707/770 |

(Continued)

OTHER PUBLICATIONS

Hatice Kevser Sonmez Sunercan, Data Integration Over Horizontally Partitioned Databases in Service-Oriented Data Grids, Sep. 2010, 93 pages, The Graduate School of Natural and Applied Sciences of Middle East Technical University, retrieved from http://etd.lib.metu.edu.tr/upload/12612414/index.pdf on Aug. 28, 2014.

(Continued)

*Primary Examiner* — Jorge A Casanova
(74) *Attorney, Agent, or Firm* — Haynes and Boone, LLP

(57) ABSTRACT

An example method of submitting a federated query to one or more data sources belonging to a federation includes splitting a zone into a plurality of zone subsets. The zone includes a plurality of data sources belonging to a federation. The plurality of zone subsets has disjoint sets of data sources belonging to the federation. The method also includes receiving a federated query from a client. The federated query includes a plurality of source queries. Each source query of the plurality of source queries is specific to an autonomous data source belonging to the federation. The method further includes determining the client's assigned zone subset of the plurality of zone subsets. The method also includes submitting the federated query to the client's assigned zone subset. The plurality of source queries is submitted to one or more data sources in the zone subset to which the client is assigned.

20 Claims, 6 Drawing Sheets

(56) References Cited

U.S. PATENT DOCUMENTS

| | | | |
|---|---|---|---|
| 2007/0192300 A1* | 8/2007 | Reuther | G06F 17/30427 |
| 2009/0063453 A1* | 3/2009 | Adler | G06F 17/30545 |
| 2012/0109892 A1 | 5/2012 | Novik et al. | |
| 2012/0109926 A1 | 5/2012 | Novik et al. | |

OTHER PUBLICATIONS

Olaf Gorlitz, Steffen Staab, Federated Data Management and Query Optimization for Linked Open Data, copyrighted 2011, 30 pages, Institute for Web Science and Technologies, University of Koblenz-Landau, Germany, retrieved from http://www.researchgate.net/publication/225651676_Federated_Data_Management_and_Query_Optimization_for_Linked_Open_Data/file/e0b4523abe0027432.pdf on Aug. 28, 2014.

Junjun Zhang, Syed Haider, Joachim Baran, Anthony Cros, Jonathan M. Guberman, Jack Hsu, Yong Liang, Long Yao, Arek Kasprzyk, BioMart: A data Federation Framework for Large Collaborative Projects, 14 pages, Ontario Institute for Cancer Research, Toronto, Informatics and Biocomputing, Ontario M5G 0A3, Canada; Computer Laboratory, University of Cambridge, Cambridge CB3 0FD, UK, retrieved from http://database.oxfordjournals.org/content/2011/bar038.full on Aug. 28, 2014.

Oracle® Fusion Middleware Administrator's Guide for Oracle Virtual Directory 11g Release 1 (Jan. 1, 2011), 27 pages, retrieved from http://docs.oracle.com/cd/E25178_01/oid.1111/e10046/und_ovd.htm on Aug. 28, 2014.

* cited by examiner

PEAK DATA FEDERATION MULTIZONE SPLITTING

FIELD OF DISCLOSURE

The present disclosure generally relates to computing devices, and more specifically to federated systems.

BACKGROUND

Nowadays a corporation typically has more than one enterprise software system that provides features for aspects of the corporation's business. For example, a corporation may use several different specialized software systems such as customer relationship management, bookkeeping, and resources planning systems. Additionally, business data is stored at multiple locations and in multiple databases, and the data may be maintained by different business entities. To prepare a deep analysis of its business, it may be desirable for the corporation to analyze a substantial amount of its business data. To perform such a heavy task, the corporation may use data federation technology.

Data federation technology provides the corporation with the ability to aggregate data from disparate data sources into a virtual database so that the data can be used for complex data analysis. The virtual database created by data federation technology does not contain the data itself. Rather, the virtual database contains information about the actual data and their location, and the actual data is left in its original place. The use of data federation may be especially useful when a corporation's data is stored offsite, for example, by a third-party cloud service provider.

A federated system is a collection of cooperating but autonomous data sources belonging to a federation. The data sources belonging to the federation cooperate with each other yet maintain some degree of autonomy. A federated system allows a client to send requests to multiple data sources with the use of a single federated query. A federated query is a query that contains several embedded source queries, and each source query is specific to a data source. A source query that is specific to a data source is written in a format that is understandable by the data source and may be executable at the data source. In a federated system, a federated server may receive a federated query from the client and send each source query embedded in the federated query to the appropriate data source for execution. When a client submits a federated query, the federated server may return a result of the federated query by retrieving results from the applicable data sources.

When a client desires to submit a read query, the client will contact any database server belonging to the federation and receive a result from that database server. When a client desires to submit a write query, the federated system submits a distributed transaction in order to write to all of the database servers simultaneously. The write operation is typically an expensive operation in the federated system.

BRIEF SUMMARY

It may be desirable to scale and increase the performance of data sources. Methods, systems, and techniques for submitting a federated query to one or more data sources belonging to a federation are provided.

According to an embodiment, a method of submitting a federated query to one or more data sources belonging to a federation includes splitting a zone into a plurality of zone subsets. The zone includes a plurality of data sources belonging to a federation. The plurality of zone subsets has disjoint sets of data sources belonging to the federation. The method also includes receiving a federated query from a client. The federated query includes a plurality of source queries. Each source query of the plurality of source queries is specific to an autonomous data source belonging to the federation. The method further includes determining the client's assigned zone subset of the plurality of zone subsets. The method also includes submitting the federated query to the client's assigned zone subset. The plurality of source queries is submitted to one or more data sources in the zone subset to which the client is assigned.

According to another embodiment, a system for submitting a federated query to one or more data sources belonging to a federation includes a splitter that identifies a zone including a federation of data sources and splits the zone into disjoint sets of data sources. For each disjoint set of data sources, the splitter assigns the respective disjoint set of data sources to a zone subset. The system also includes an assignment module that assigns each client of a set of clients to at most one zone subset. The system further includes a federation engine that receives a federated query from a client, determines an assigned zone subset to which the client is assigned, and submits the federated query to the assigned zone subset. The federated query includes a plurality of source queries. Each source query of the plurality of source queries is specific to an autonomous data source belonging to the federation. The plurality of source queries is submitted to one or more data sources in the assigned zone subset.

According to another embodiment, a machine-readable medium including a plurality of machine-readable instructions that when executed by one or more processors is adapted to cause the one or more processors to perform a method including: splitting a zone into a plurality of zone subsets, the zone including a plurality of data sources belonging to a federation, and the plurality of zone subsets having disjoint sets of data sources belonging to the federation; receiving a federated query from a client, the federated query including a plurality of source queries, and each source query of the plurality of source queries being specific to an autonomous data source belonging to the federation; determining an assigned zone subset of the plurality of zone subsets to which the client is assigned; and submitting the federated query to the assigned zone subset, where the plurality of source queries is submitted to one or more data sources in the zone subset to which the client is assigned.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

Embodiments of the present disclosure and their advantages are best understood by referring to the detailed description that follows.

DETAILED DESCRIPTION

I. Overview
II. Example System Architecture
III. Zone Phases
   A. Normal Phase
   B. Switch from Normal Phase to Peak Phase
     1. Split Zone into a Plurality of Zone Subsets
     2. Assign Clients to Zone Subsets
   C. Recursive Splitting of Zone Subsets
   D. Switch from Peak Phase to Normal Phase
     1. Merge the Plurality of Zone Subsets into a Single Zone
     2. Propagate Changes
IV. Example Method
V. Example Computing System

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

In a federated system, a single query can result in data being extracted from a plurality of databases. A target data source may refer to a data source to which a query is to be sent. The present disclosure provides techniques to scale and increase the performance of data sources.

According to an embodiment, a method of submitting a federated query to one or more data sources belonging to a federation includes splitting a zone into a plurality of zone subsets. The zone includes a plurality of data sources belonging to a federation. The plurality of zone subsets has disjoint sets of data sources belonging to the federation. The method also includes receiving a federated query from a client. The federated query includes a plurality of source queries. Each source query of the plurality of source queries is specific to an autonomous data source belonging to the federation. The method further includes determining the client's assigned zone subset of the plurality of zone subsets. The method also includes submitting the federated query to the client's assigned zone subset. The plurality of source queries is submitted to one or more data sources in the zone subset to which the client is assigned.

Unless specifically stated otherwise, as apparent from the following discussion, it is appreciated that throughout the description, discussions utilizing terms such as "splitting", "receiving", "determining", "submitting", "sending", "assigning", and "detecting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
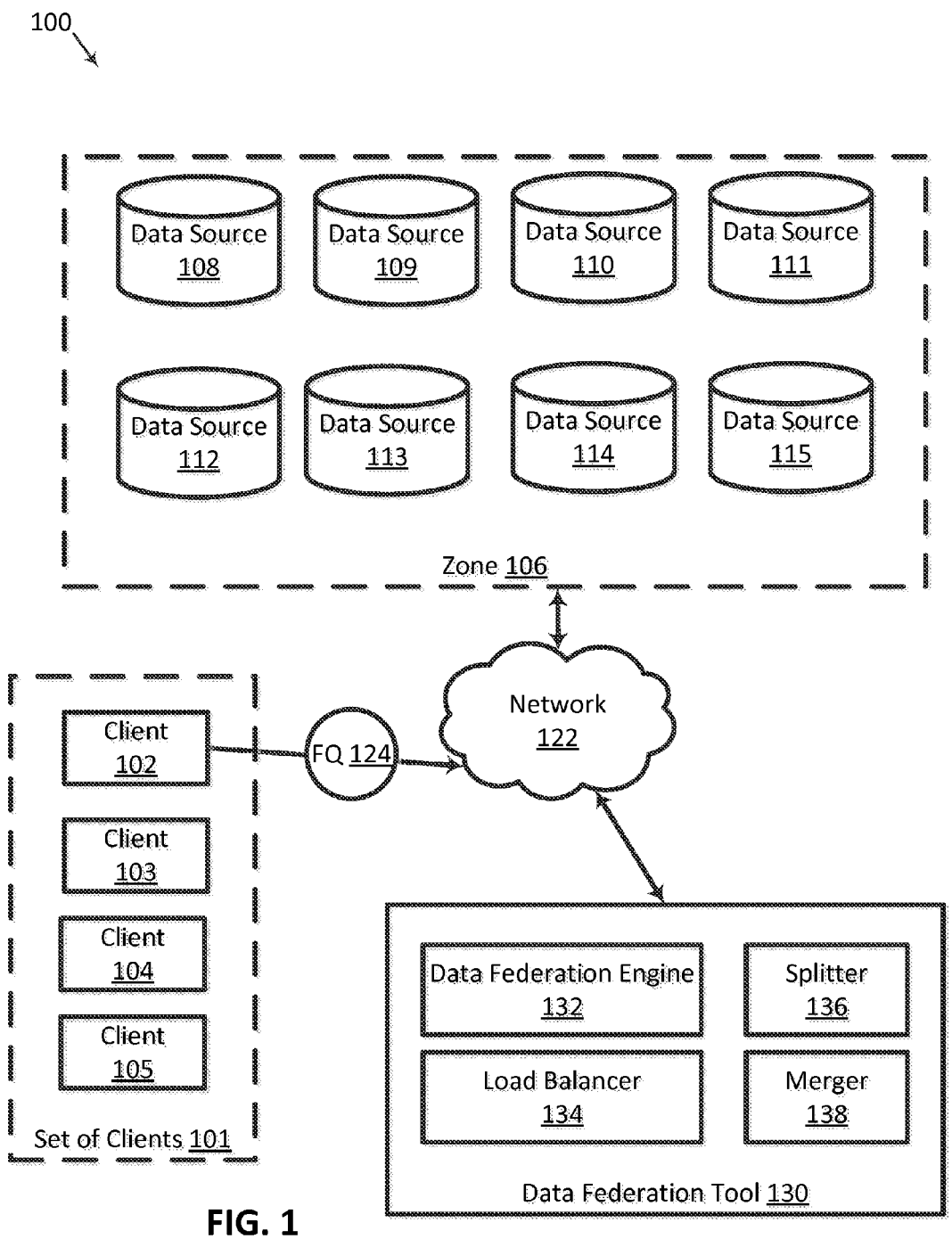
FIG. 1 is a block diagram illustrating a federated system for submitting a federated query to one or more data sources belonging to a federation, according to some embodiments.

FIG. 1 is a block diagram illustrating a federated system 100 for submitting a federated query to one or more data sources belonging to a federation, according to some embodiments. System 100 includes a set of clients 101, zone 106 including a plurality of data sources 108-115, and data federation tool 130 coupled via a network 122. Set of clients 101 includes clients 102-105 that may access each of the data sources in zone 106. Although four clients and eight data sources are illustrated, this is not intended to be limiting, and system 100 may include one or more clients and one or more data sources.

A client may be a personal computer (PC), workstation, mobile device (e.g., a mobile phone, personal digital assistant (PDA), tablet, and laptop), game console, set-top box, kiosk, embedded system, or other device having at least one processor and memory. The client may also be an application run on a PC, server, database, etc. Additionally, the client may be a fat client (e.g., a client that performs local processing and data storage), a thin client (e.g., a client that performs minimal or no local processing and minimal to no data storage), and/or a hybrid client (e.g., a client that performs local processing but little to no data storage).

Each of data sources 108-115 may be autonomous data sources that belong to a federation. The data sources may be external systems that store data accessible over network 122. In an example, two or more data sources in the federation may be heterogeneous data sources that accept different query formats relative to each other. In another example, two or more data sources in the federation may be homogenous data sources that accept the same query formats relative to each other. Additionally, two of more of the data sources may be provided by the same data provider or different data providers. In an example, data source 108 is an ORACLE® database provided by ORACLE®, and data source 109 is a DB2® database provided by IBM®. Trademarks are the properties of their respective owners. In another example, data source 108 is an ORACLE® database, and data source 109 is a web service.

Data federation tool 130 may execute on a computing device having at least one processor for executing and otherwise processing instructions and further having a memory device for storing information (e.g., instructions executed by the processor and data operated upon by the processor in response to such instructions). In an example, data federation tool 130 executes on a federated server that may be a single machine or may include multiple interconnected machines (e.g., machines configured in a cluster).

Data federation tool 130 mines data from autonomous data sources that are managed by data providers. A data provider is an entity that owns, controls, and manages data. Data federation tool 130 accesses data from multiple, heterogeneous or homogenous data sources, and creates reusable, business-friendly logical data models and views by combining and transforming data. In an example, data federation tool 130 is JBOSS® DATA VIRTUALIZATION provided by RED HAT®. Data federation engine 122 may make unified data consumable through standard interfaces. In an example, data federation tool 130 makes unified data consumable through open standard interfaces.

Network 122 may be a private network (e.g., local area network (LAN), wide area network (WAN), intranet, etc.), a public network (e.g., the Internet), or a combination thereof. The network may include various configurations and use various protocols including the Internet, World Wide Web, intranets, virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, WiFi and HTTP, and various combinations of the foregoing.

Client 102 may send a federated query 124 to data federation tool 130 for processing. Federated query 124 includes a plurality of source queries that may each be sent to the same or different data sources in zone 106. Client 102 may submit the high-level federated query to data federation tool 130 for processing without knowing which data source will respond to the query. Data federation tool 130 enables clients to treat data sources belonging to the federation as one virtual database and access them with the use of a single federated query.

Figure 2:
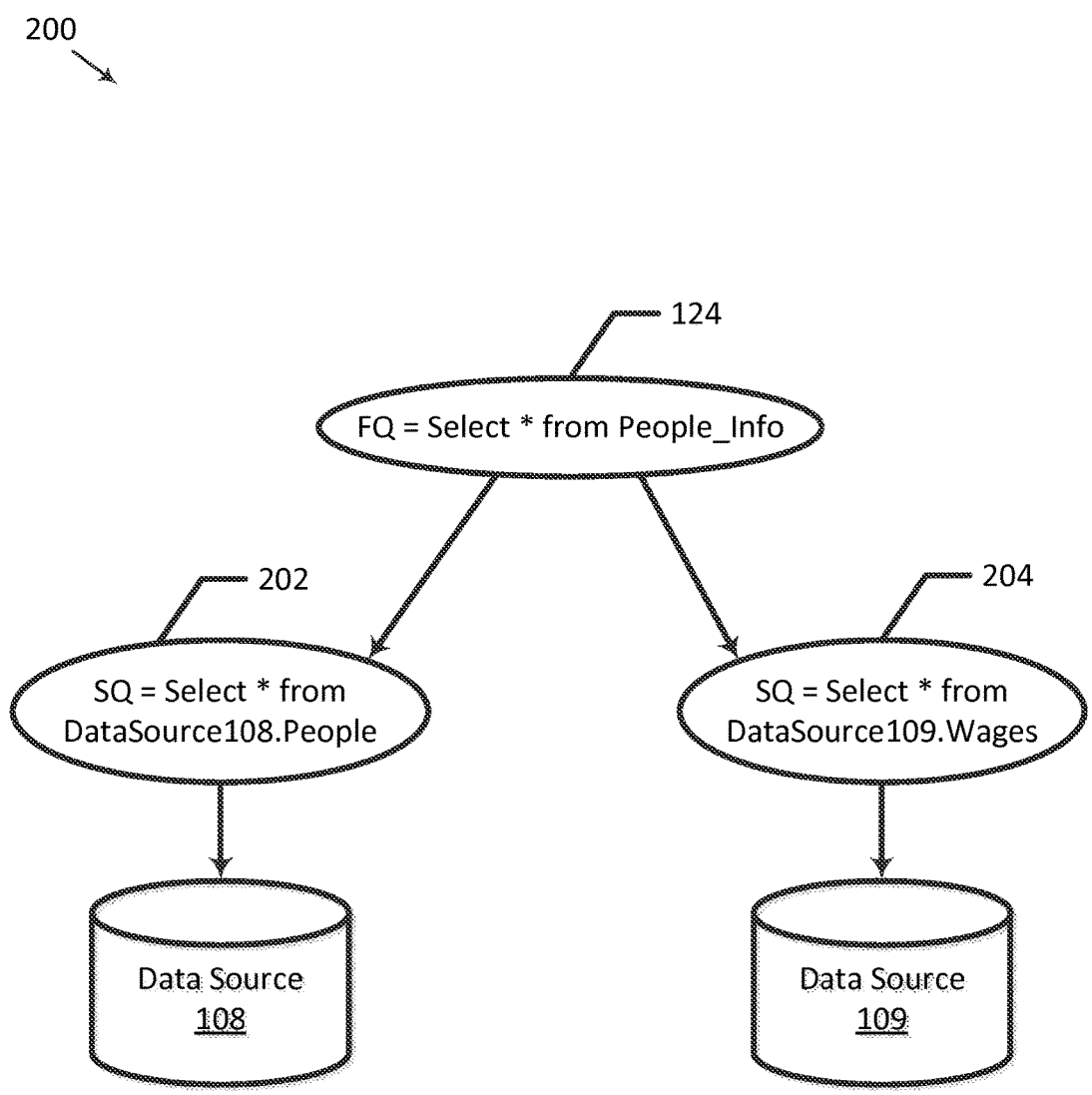
FIG. 2 is an example of a federated query, according to some embodiments.

FIG. 2 is an example 200 of a federated query, according to some embodiments. In the example illustrated in FIG. 2, federated query 124 is a query, "Select * from People Info", that retrieves information about people in an organization (e.g., employees of the organization and wages). Data federation tool 130 includes a data federation engine 132 that identifies a plurality of autonomous data sources to which to send the plurality of source queries embedded in federated query 124. Data federation engine 132 receives federated query 124 and breaks it down into a federated query plan. The federated query plan defines one or more target data sources belonging to the federation and one or more source queries to be executed against each of the one or more target data sources. Each source query of the plurality of source queries is specific to an autonomous data source belonging to the federation.

The source queries are distributed to the data sources in accordance with the federated query plan. In FIG. 2, data federation engine 132 breaks down federated query 124 into a federated query plan that includes embedded source queries 202 and 204. The federated query plan identifies data source 108 as being the target data source of source query 202 and identifies data source 109 as being the target data source of source query 204. Source query 202 is a query, "Select * from DataSource108.People", where "DataSource108" is a source of the table "People". In such an example, source query 202 is specific to data source 108, which stores at least a table "People" from which data is retrieved based on execution of source query 202 against data source 108. Source query 204 is a query, "Select * from DataSource109.Wages", where "DataSource109" is a source of the table "Wages". In such an example, source query 204 is specific to data source 109, which stores at least a table "Wages" from which data is retrieved based on execution of source query 204 against data source 109. In an example, source query 202 is not executable at data source 109, and source query 204 is not executable at data source 108. It should be understood that data source 108 may also store the table "Wages" and that data source 109 may also store the table "People". Data sources 108 and 109 may accept the same or different query formats and/or store data in the same or different schemas.

Data federation engine 132 may aggregate the results from the different data sources and provide a common view of the result. A data view is a basic building block of data federation and may be used in the scope of one federated query.

III. Zone Phases

Data sources 108-115 may store the same data such that when client 102 sends federated query 124 to data federation engine 132, data federation engine 132 may select any of the data sources in zone 106 to respond to the query. A zone or zone subset may be in a normal phase or a peak phase.

A. Normal Phase

During a normal phase of zone 106, data sources 108-115 are in a single zone 106 and clients may access any of the data sources in the zone. During the normal phase of zone 106, clients may send a federated query to data federation engine 132, which breaks the federated query into a federated query plan and submits the source queries embedded in the federated query to any of the data sources in the zone.

If federated query 124 is a read query, data federation engine 132 may assign one data source in zone 106 as client 102's dedicated data source and send each of the embedded source queries of the read query to the dedicated data source. Data federation engine 132 may also send the embedded source queries of federated query 124 to different data sources in zone 106. If federated query 124 is a write query, data federation engine 132 ensures consistency between the data sources in zone 106. During the normal phase of zone 106, if client 102 sends a write query to data federation engine 132, data federation engine 132 runs a distributed transaction that writes data to every data source in the zone. As such, the write query may be an expensive operation because each of the data sources in zone 106 modifies its data. The write query may slow down other queries from executing against the data sources in zone 106 because each of these data sources is updated. This may be especially troublesome during peak time when zone 106 is especially busy. Clients may be forced to wait a longer time than normal, thus degrading the user experience.

Data federation tool 130 includes a load balancer 134 that balances clients among the data sources in zone 106 so that clients do not overload any particular data source with too many client requests. Load balancer 134 detects when zone 106 is experiencing a high load. In response to detecting that zone 106 is experiencing a high load, load balancer 134 may switch zone 106 from the normal phase to a peak phase.

Load balancer 134 may detect that zone 106 is experiencing a high load in a variety of ways. Load balancer 134 may desire to limit the frequency of incoming write queries to any particular zone at a time. In an example, load balancer 134 maintains a count of write queries from one or more clients in set of clients 101 to zone 106. The count is for a sliding window that spans a time period. For example, load balancer 134 may track the number of write queries from clients to zone 106 within a ten-second sliding window. In response to the detected amount of write queries exceeding the threshold amount within the time period, load balancer 134 may determine that zone 106 is experiencing a high load and thus switch zone 106 from the normal phase to the peak phase.

In another example, load balancer 134 detects a query response time above a threshold response time from one or more data sources in zone 106. The response time may be a preconfigured response time (e.g., 10 seconds). In some embodiments, load balancer 134 has a sample query that load balancer 134 periodically sends to one or more data sources in a zone to determine the query response time of the zone. Additionally, load balancer 134 may randomly select the data source against which to execute the sample query. In response to detecting the query response time being above the threshold response time, load balancer 134 may determine that zone 106 is experiencing a high load and thus switch zone 106 from the normal phase to the peak phase.

B. Switch from Normal Phase to Peak Phase

During the peak phase of zone 106, it may be desirable to split zone 106 into a plurality of zone subsets and assign disjoint sets of data sources belonging to zone 106 to the zone subsets. Additionally, a client in set of clients 101 may be assigned to a zone subset. Client may access only the data sources in their assigned zone subsets. In particular, data federation engine 132 may direct federated queries from clients to the data sources in the zone subsets to which the clients are assigned. Accordingly, clients may have designated data sources in an assigned zone subset at specific times. If applicable, a zone subset may be referred to as a zone, and a zone may be referred to as a zone subset in the present disclosure. Additionally, splitter 136 may split zone 106 into a plurality of zone subsets and assign clients to a zone subset based on other conditions. For example, splitter 136 may split zone 106 into a plurality of zone subsets and assign clients to a zone subset if the number of data sources in zone 106 exceeds a threshold amount.

1. Split Zone into a Plurality of Zone Subsets

Figure 3:
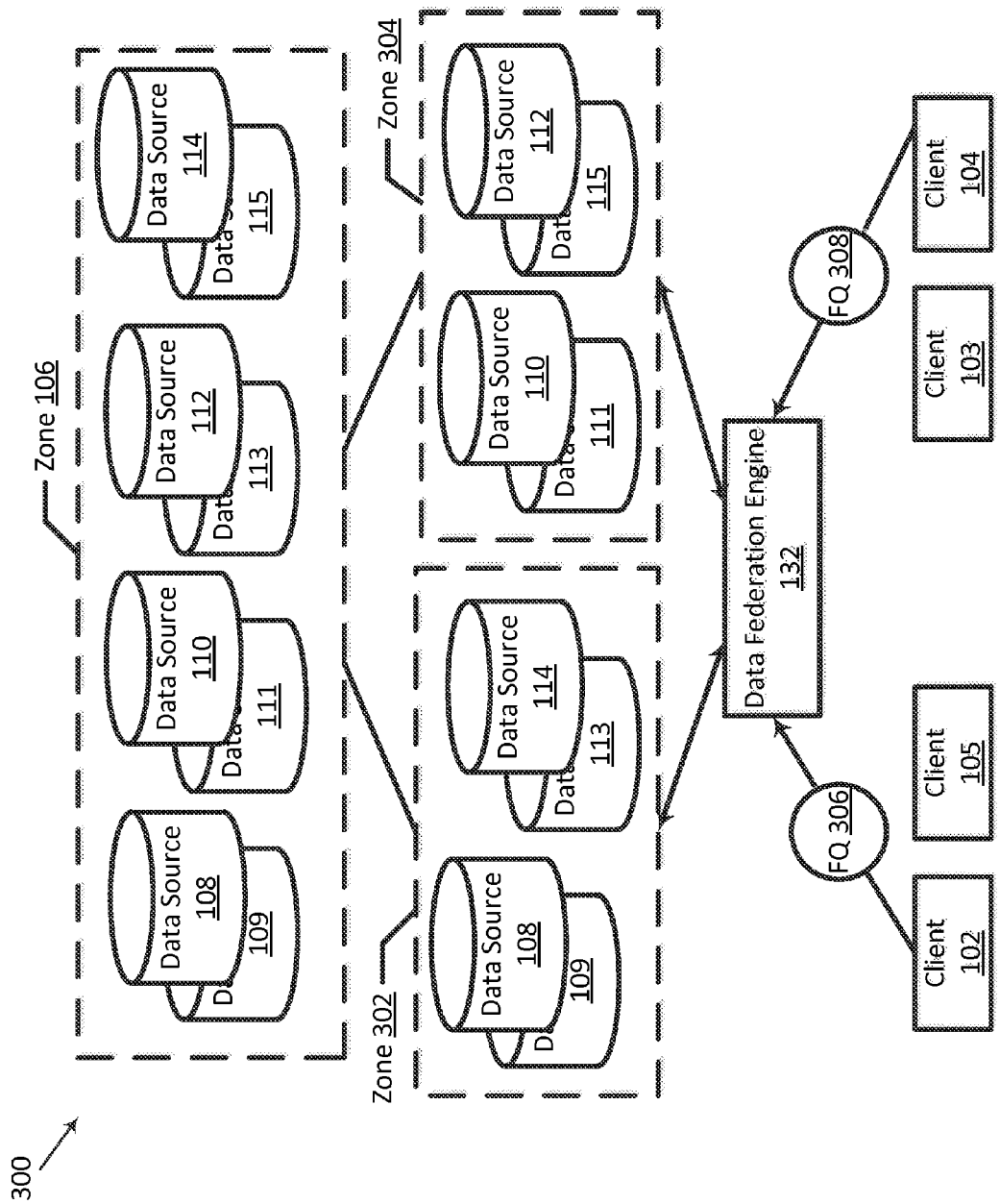
FIG. 3 is a block diagram illustrating a zone split into a plurality of zone subsets, according to some embodiments.

In some embodiments, splitter 136 splits zone 106 into a plurality of zone subsets. FIG. 3 is a block diagram 300 illustrating zone 106 split into a plurality of zone subsets, according to some embodiments. In FIG. 3, zone 106 includes data sources 108-115 belonging to a federation, and splitter 136 splits zone 106 into zone subsets 302 and 304.

Splitter 136 assigns a first subset of data sources belonging to zone 106 to zone subset 302 and assigns a second subset of data sources belonging to zone 106 to zone subset 304, where the zone subsets have disjoint sets of data sources. In particular, zone subset 302 includes the first subset of data sources 108, 109, 113, and 114, and zone subset 304 includes the second subset of data sources 110, 111, 112, and 115. The first subset of data sources is disjoint from the second subset of data sources.

In an example, splitter 136 randomly selects the data sources that it assigns to a particular zone subset. In another example, splitter 136 selects the data sources that it assigns to a particular zone subset based on one or more criteria. For example, splitter 136 may take into consideration the geographical location of a data source and group the data sources closest to each other into one zone subset.

2. Assign Clients to Zone Subsets

Splitter 136 assigns clients to zone subsets. Splitter 136 may randomly assign clients to zone subsets. In an example, when data federation engine 132 receives a federated query from a client, data federation engine 132 may send the federated query to a randomly selected zone subset and note that the client's request was sent to this particular zone subset. In an example, splitter 136 may assign the client to the particular zone subset. At a later point in time while the zone subset still exists and has not been split further (as will be explained further below), data federation engine 132 may then direct all future requests to the client's assigned zone subset. In another example, splitter 136 assigns clients to zone subsets based on one or more criteria. For example, splitter 136 may take into consideration the geographical location of a client and assign clients closest to each other to the same zone subset. In another example, splitter 136 may determine which clients have similar needs and assign clients with similar needs to the same zone subset.

Clients access the data sources in the zone subsets to which the clients are assigned. In an example, splitter 136 assigns clients 102 and 105 in set of clients 101 to zone subset 302, and assigns clients 103 and 104 in set of clients 101 to zone subset 304. Data federation engine 132 may receive a federated query 306 from client 102 or client 105. The federated query includes a plurality of source queries, and each source query of the plurality of source queries is specific to an autonomous data source belonging to the federation.

Data federation engine 132 determines the zone subset of the plurality of zone subsets to which the client is assigned. In the example, client is assigned to zone subset 302. Accordingly, data federation engine 132 submits federated query 306 from client 102 to zone subset 302. In such an example, each of the plurality of source queries in federated query 306 is submitted to one or more data sources in zone subset 302 (e.g., data source 108, 109, 113, and/or 114). Data federation engine 132 may submit the embedded source queries to the same or different data sources in zone subset 302. For each of the submitted source queries of the plurality of source queries, data federation engine 132 receives a result of the respective source query. Data federation engine 132 determines a final result based on the one or more received results and sends the final result to client 102. Similarly, any federated queries that data federation engine 132 receives from client 105 are also sent to the data sources in zone subset 302. Clients 102 and 105 do not access (e.g., read from or write to) data sources in any zone subsets to which they are not assigned.

In an example, the federated query is a read query (e.g., a SELECT query in Structured Query Language (SQL)), write query (e.g., an INSERT statement in SQL), or hard read query. During the peak phase of zone 106, if federated query 306 is a read query, data federation engine 132 may assign one data source in zone subset 302 as client 102's dedicated data source and send each of the embedded source queries of the read query to the dedicated data source. Data federation engine 132 may also send the embedded source queries of federated query 306 to different data sources in zone subset 302. In contrast during the normal phase of zone 106, client 102 has read access to each of the data sources in zone 106 (e.g., data sources 108-115) and not just to the data sources in zone subset 302. For example, client 102 also has access to data sources 110, 111, 112, and 115 in zone subset 304. Thus, the number of data sources to which client 102 has read access is reduced during the peak phase of zone 106. A benefit of an embodiment may provide high ready query speeds.

If federated query 306 is a write query, data federation engine 132 ensures consistency between the data sources in zone subset 302. During the peak phase of zone 106, if federated query 306 is a write query, data federation engine 132 runs a distributed transaction that writes data to every data source in zone subset 302, but not in zone subset 304. As such, during the peak phase of zone 106, the write query is a less expensive operation because fewer data sources are being updated based on the write query compared to during the normal phase of zone 106. For example, during the normal phase of zone 106, when client 102 issues a write query data federation engine 132 submits the write query to each of the data sources in zone 106 (e.g., data sources 108-115) such that each of the data sources in zone 106 updates their data. Thus, the number of data sources to which client 102 has write access is reduced during the peak phase of zone 106 and fewer data sources are updated. A benefit of an embodiment may provide high speed of write queries that scale automatically.

A hard read query may be a read query that accesses all available zone subsets that have not been split. Referring to FIG. 3, during the peak phase of zone 106, splitter 136 splits the zone into zone subsets 302 and 304. If client 102 sends a federated write query to data federation engine 132 and data federation engine 132 sends the source queries embedded in the write query to each of the data sources in zone subset 302, the data sources in zone subset 302 will have the most up-to-date data, but 304 will not have the most up-to-date data. In particular, if client 104, which is assigned to zone subset 304, sends a federated read query to data federation engine 132, data federation engine 132 may send the read query to zone subset 304. In such an example, client 104 may receive stale results because no data sources in zone subset 304 have been updated with the most recent data written into zone subset 302 yet.

To avoid reading stale data, the client may send a hard read query to data federation engine 132 to ensure that the client is reading the most up-to-date data. The client may send the hard read query when, for example, the data the client desires to read is updated often and is updated by many clients. If client 104 sends a hard read query to data federation engine 132, data federation engine 132 submits the hard read query to all the subzones that have not been split (e.g., subzones 302 and 304). Data federation engine 132 may retrieve results from the data sources in each of the subzones and determine which one has the most up-to-date data. Data federation engine 132 may then send client 104 the most up-to-date data.

C. Recursive Splitting of Zone Subsets

Figure 4:
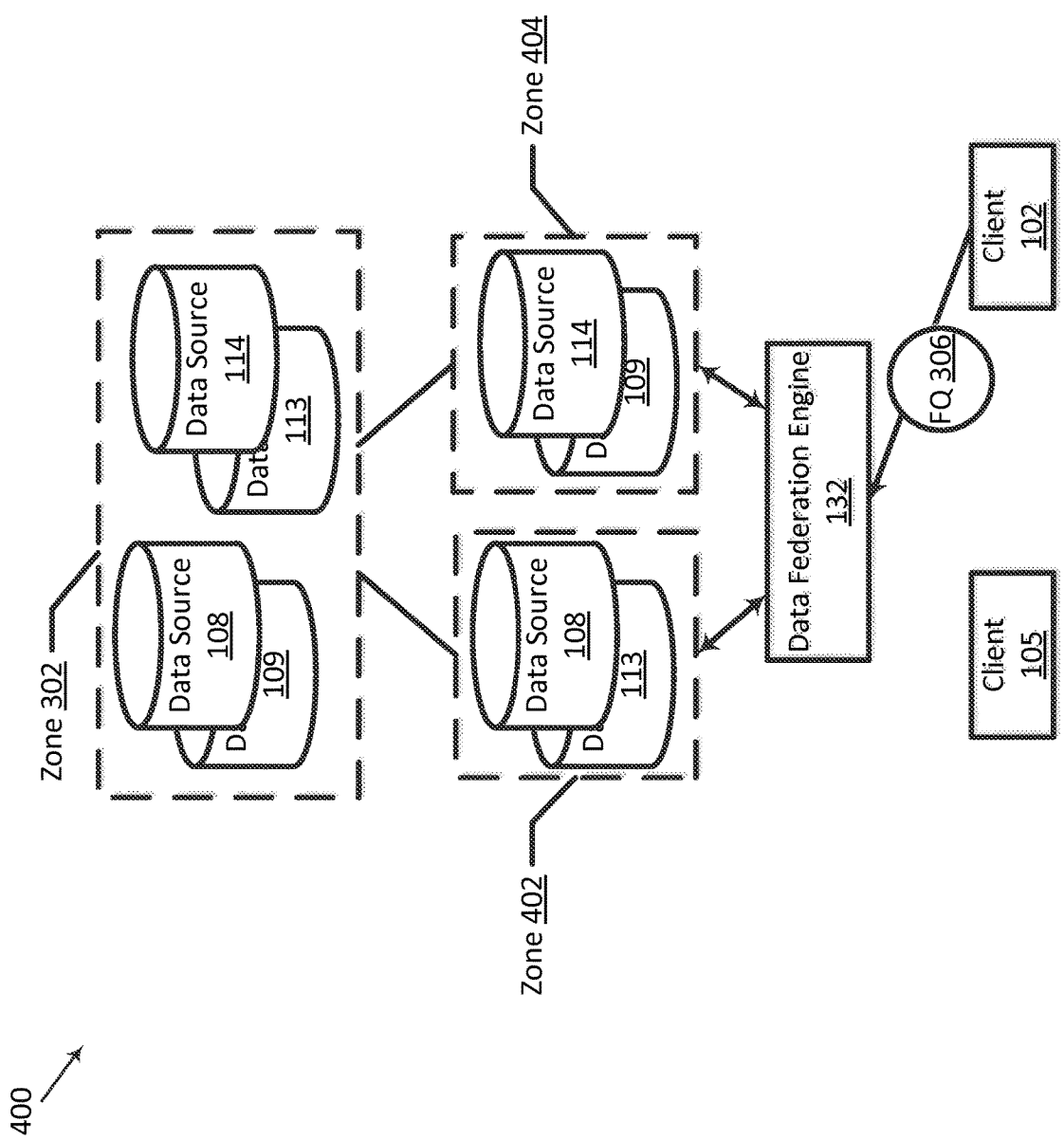
FIG. 4 is a block diagram illustrating a zone subset split into a plurality of zone subsets, according to some embodiments.

It should be understood that operations that are described in the present disclosure as being applied on a zone may also be applied on a zone subset, if applicable. For example, splitter 136 may continue to split a zone subset recursively. For example, load balancer 134 may detect when zone subset 302 or 304 is experiencing a high load (as discussed above). In response to load balancer 134 detecting that zone subset 302 is experiencing a high load, splitter 136 may split zone subset 302 into a plurality of zone subsets. FIG. 4 is a block diagram 400 illustrating zone subset 302 split into a plurality of zone subsets, according to some embodiments. In FIG. 4, zone subset 302 includes data sources 108, 109, 113, and 114 belonging to the federation, and splitter 136 splits zone subset 302 into zone subsets 402 and 404.

Splitter 136 assigns a third subset of data sources belonging to zone subset 302 to zone subset 402 and assigns a fourth subset of data sources belonging to zone subset 302 to zone subset 404, where the zone subsets have disjoint sets of data sources. In particular, zone subset 402 includes the third subset of data sources 108 and 113, and zone subset 404 includes the fourth subset of data sources 109 and 114. The third subset of data sources is disjoint from the fourth subset of data sources.

Additionally, splitter 136 assigns clients to the zone subsets split from zone subset 302. For example, splitter 136 may assign client 105 to zone subset 402 and may assign client 102 to zone subset 404. In such an example, data federation engine 132 submits federated queries issued by client 105 to one or more data sources in zone subset 402 (and not zone subset 404), and submits federated queries issued by client 102 to one or more data sources in zone subset 404 (and not zone subset 402).

D. Switch from Peak Phase to Normal Phase

1. Merge the Plurality of Zone Subsets into a Single Zone

In some embodiments, merger 138 merges the plurality of zone subsets split from a single zone back into the single zone. During the peak phase of one or more zone subsets split from a zone, load balancer 134 may detect when a zone subset is not experiencing a high load. In an example discussed above in which load balancer 134 tracks the number of write queries from clients to a zone subset within a sliding window, load balancer 134 may detect that the amount of write queries within the sliding window does not exceed the threshold amount of write queries. In another example discussed above in which load balancer 134 detects a query response time above a threshold response time from one or more data sources in zone 106, load balancer 134 may detect that the query response time does not fall above the threshold response time.

In response to detecting that the zone subset is not experiencing a high load, merger 138 merges the plurality of zone subsets split from a zone back into the zone, where the zone is in the normal phase. For example and in reference to FIG. 4, in response to determining that zone subset 402 is not experiencing a high load, merger 138 may merge zone subsets 402 and 404 into single zone 302. In particular merger 138 may merge the disjoint set of data sources in each of zone subsets 402 and 404 into single zone 302. The single zone includes each of the data sources in the plurality of zone subsets. Merger 138 may merge the zone subsets split from a single zone from the bottom of the tree up to the root of the tree to eventually have all of the data sources back in zone 106 (see FIG. 1).

2. Propagate Changes

Changes that are made to a data source in a zone subset since the split are propagated to the other data sources in the other zone subsets. In an example, merger 138 identifies updated data in zone subset 402 since zone 302 was split into zone subsets 402 and 404. Merger 138 may propagate the updated data from zone subset 402 to zone subset 404, and each of the data sources in zone subset 404 may store the updated data. Accordingly, after the plurality of zone subsets split from a zone is completely merged into a single zone, each of the data sources in the single zone has all of the most up-to-date data.

After the plurality of zone subsets is merged into the single zone, data federation engine 132 may receive a federated query from client 102. The federated query includes a plurality of source queries, and each source query of the plurality of source queries is specific to an autonomous data source belonging to the federation. Data federation engine 132 may submit the federated query to the merged single zone, where the plurality of source queries is submitted to one or more data sources in the single zone. Each of the unsplit zone subsets may eventually be recursively merged into a single zone such that zone 106 exists again. In this example, each client in set of clients 101 has access to each of the data sources in zone 106.

The present disclosure provides techniques to scale and increase the performance of data sources. The splitting and the merging operations on the zone or zone subsets may be transparent to clients. Clients may continue to submit their federated queries like normal to data federation engine 132, which directs the federated queries to the zone or zone subset to which the particular client has been assigned.

As discussed above and further emphasized here, FIGS. 1-4 are merely examples, which should not unduly limit the scope of the claims. For example, although a zone or zone subset is illustrated as being split into two zone subsets and each of the zone subsets having the same number of data sources, this is not intended to be limiting. For example, embodiments in which a zone is split into three or more zone subsets or in which a zone is split into zone subsets that each have a different number of data sources are within the scope of the present disclosure.

IV. Example Method

Figure 5:
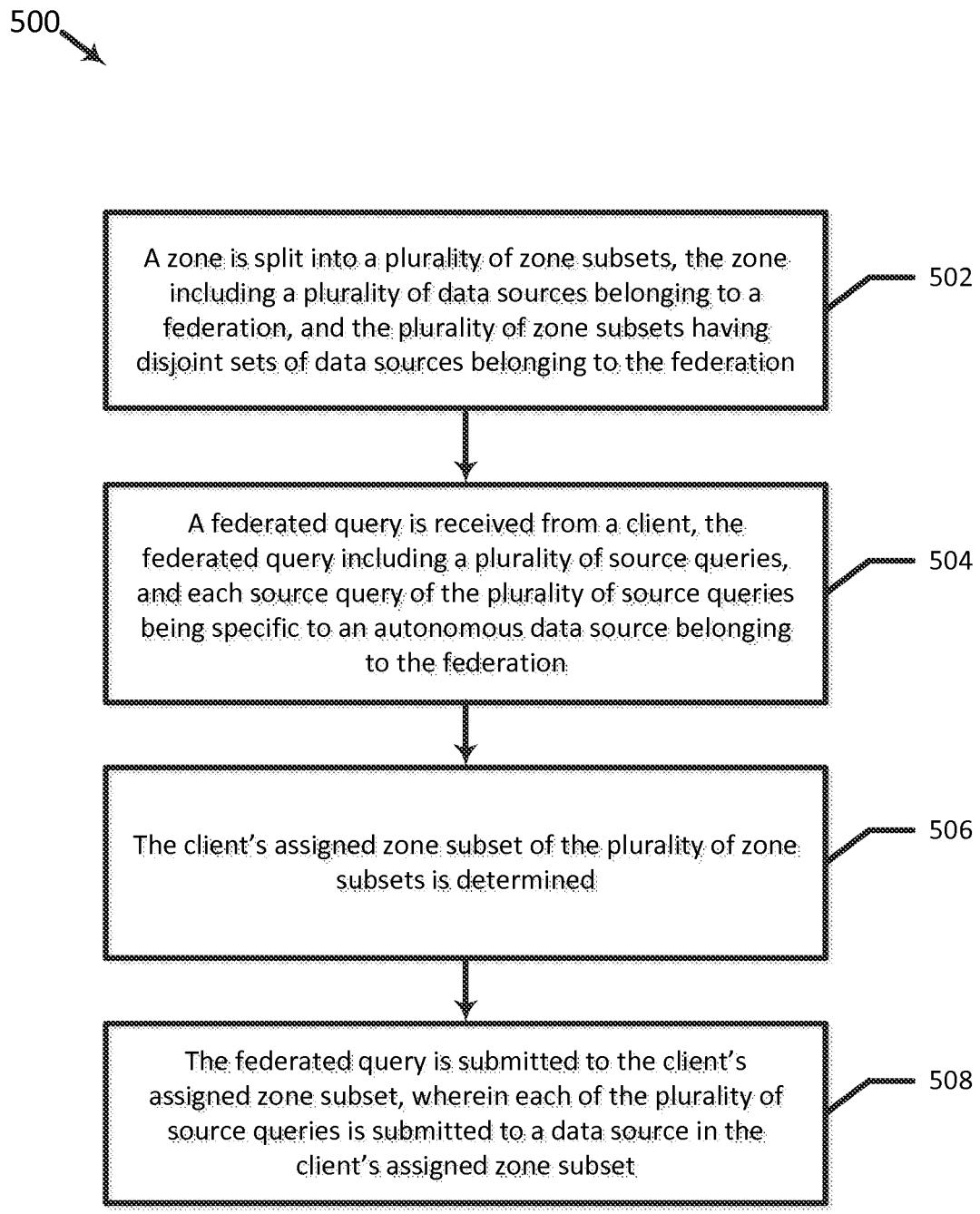
FIG. 5 is a flowchart illustrating a method of submitting a federated query to one or more data sources belonging to a federation, according to an embodiment.

FIG. 5 is a flowchart illustrating a method 500 of submitting a federated query to one or more data sources belonging to a federation, according to some embodiments. Method 500 is not meant to be limiting and may be used in other applications.

In FIG. 5, method 500 includes blocks 502-508. In a block 502, a zone is split into a plurality of zone subsets, the zone including a plurality of data sources belonging to a federation, and the plurality of zone subsets having disjoint sets of data sources belonging to the federation. In an example, splitter 136 splits a zone 106 into a plurality of zone subsets including zone subsets 302 and 304, zone 106 including data sources 108-115 belonging to a federation, and zone subsets 302 and 304 having disjoint sets of data sources belonging to the federation.

In a block 504, a federated query is received from a client, the federated query including a plurality of source queries, and each source query of the plurality of source queries being specific to an autonomous data source belonging to the federation. In an example, data federation engine 132 receives federated query 306 from client 102, the federated query including a plurality of source queries, and each source query of the plurality of source queries being specific to an autonomous data source belonging to the federation.

In a block 506, the client's assigned zone subset of the plurality of zone subsets is determined. In an example, data federation engine 132 determines client 102's assigned zone subset of the plurality of zone subsets.

In a block 508, the federated query is submitted to the client's assigned zone subset, wherein the plurality of source queries is submitted to one or more data sources in the client's assigned zone subset. In an example, data federation engine 132 submits federated query 302 to client 102's assigned zone subset, where the plurality of source queries is submitted to one or more data sources in the client's assigned zone subset.

It is also understood that additional processes may be inserted before, during, or after blocks 502-508 discussed above. It is also understood that one or more of the blocks of method 500 described herein may be omitted, combined, or performed in a different sequence as desired.

V. Example Computing System

Figure 6:
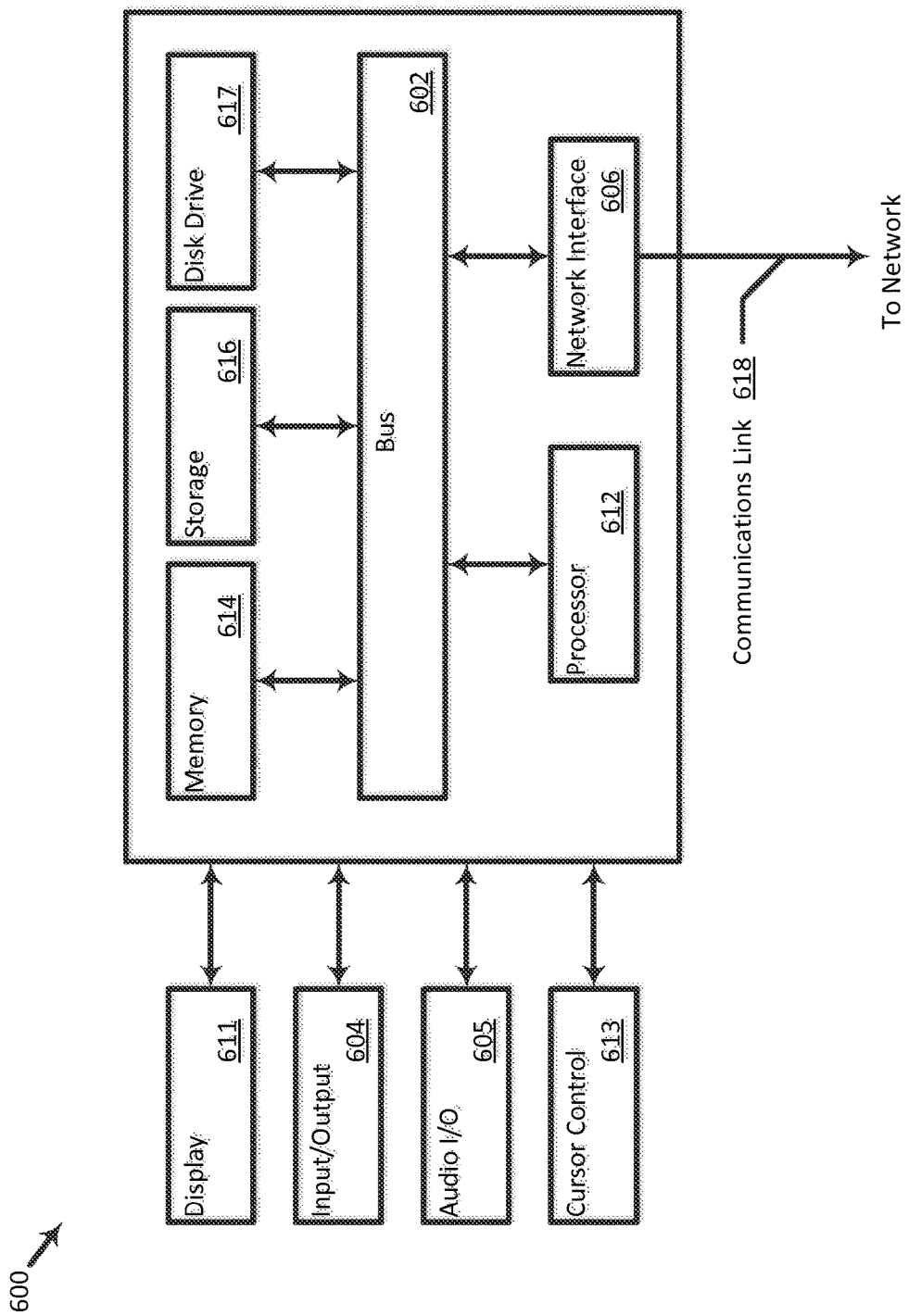
FIG. 6 is a block diagram of an electronic system suitable for implementing one or more embodiments of the present disclosure.

FIG. 6 is a block diagram of a computer system 600 suitable for implementing one or more embodiments of the present disclosure. In various implementations, computing data federation tool 130 may include a server computing device that includes one or more processors and may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component such as a display 611, and an input control such as a cursor control 613 (such as a keyboard, keypad, mouse, etc.). An optional audio input/output component 605 may also be included to allow a user to use voice for inputting information by converting audio signals into information signals. Audio I/O component 605 may allow the user to hear audio. A transceiver or network interface 606 transmits and receives signals between computer system 600 and other devices via a communication link 618 to a network. In an embodiment, the transmission is wireless, although other transmission mediums and methods may also be suitable. A processor 612, which may be a microcontroller, digital signal processor (DSP), or other processing component, processes these various signals, such as for display on computer system 600 or transmission to other devices via communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer readable medium, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 614, and transmission media includes coaxial cables, copper wire, and fiber optics, including wires that include bus 602. In an embodiment, the logic is encoded in non-transitory computer readable medium. In an example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences (e.g., method 500) to practice the present disclosure may be performed by computer system 600. In various other embodiments of the present disclosure, a plurality of computer systems 600 coupled by communication link 618 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more specific purpose computers and/or computer systems, networked and/or otherwise. Where applicable, the ordering of various actions or blocks described herein may be changed, combined into composite actions or blocks, and/or separated into sub-actions or sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of submitting a federated query to one or more data sources belonging to a federation, comprising:
   splitting a zone into a plurality of zone subsets, the zone including a plurality of data sources belonging to a federation, and the plurality of zone subsets having disjoint sets of data sources belonging to the federation;
   receiving a federated query from a client, the federated query including a plurality of source queries, and each source query of the plurality of source queries being specific to an autonomous data source belonging to the federation;
   determining the client's assigned zone subset of the plurality of zone subsets; and
   submitting the federated query to the client's assigned zone subset, wherein the plurality of source queries is submitted to one or more data sources in the client's assigned zone subset.

2. The method of claim 1, further comprising:
   for each of the submitted source queries of the plurality of source queries, receiving a result of the respective source query;
   determining a final result based on the one or more received results; and
   sending the final result to the client.

3. The method of claim 1, further comprising:
   assigning a first set of clients to the first zone subset, the client being in the first set of clients; and
   assigning a first subset of data sources belonging to the federation to the first zone subset.

4. The method of claim 3, further comprising:
   assigning a second set of clients to the second zone subset, the second set of clients including a second client;
   assigning a second subset of data sources belonging to the federation to the second zone subset;
   receiving a second federated query from the second client, the second federated query including a second plurality of source queries, and each source query of the second plurality of source queries being specific to an autonomous data source belonging to the federation; and
   submitting the second federated query to the second client's assigned zone subset, wherein second plurality of source queries is submitted to one or more data sources in the second client's assigned zone subset.

5. The method of claim 3, further comprising:
   splitting a first zone subset of the plurality of zone subsets into a second plurality of zone subsets; and
   assigning the client to a second zone subset in the second plurality of zone subsets.

6. The method of claim 5, further comprising:
   receiving a second federated query from the client, the second federated query including a second plurality of source queries, and each source query of the second plurality of source queries being specific to an autonomous data source belonging to the federation; and
   submitting the second federated query to the client's second assigned zone subset, wherein the second plurality of source queries is submitted to one or more data sources in the client's second assigned zone subset.

7. The method of claim 1, further comprising:
   before the splitting, receiving a second federated query from the client, the second federated query including a second plurality of source queries, and each source query of the second plurality of source queries being specific to an autonomous data source belonging to the federation; and
   submitting the second federated query to one or more data sources belonging to the federation.

8. The method of claim 7, wherein the first federated query is a write query that is submitted to all of the data sources in the client's assigned zone subset, and the second federated query is submitted to all of the data sources in the zone.

9. The method of claim 7, further comprising:
   detecting a threshold amount of write queries from a set of clients within a time period, wherein the splitting includes in response to detecting the threshold amount of write queries within the time period, splitting the zone.

10. The method of claim 7, further comprising:
    detecting a query response time above a threshold response time from one or more data sources in the zone, wherein the splitting includes in response to detecting the response time above the threshold response time, splitting the zone.

11. The method of claim 1, further comprising:
    merging the plurality of zone subsets into a single zone, the single zone including each of the data sources in the plurality of zone subsets, and the plurality of zone subsets including a first zone subset and a second zone subset;
    identifying updated data in the first zone subset of the plurality of zone subsets since the splitting; and
    propagating the updated data from the first zone subset to the second zone subset, wherein each of the data sources in the second zone subset stores the updated data.

12. The method of claim 11, further comprising:
    receiving a second federated query from the client, the second federated query including a second plurality of source queries, and each source query of the second plurality of source queries being specific to an autonomous data source belonging to the federation; and submitting the second federated query to the single zone, wherein the second plurality of source queries is submitted to a data source in the single zone.

13. A system for submitting a federated query to one or more data sources belonging to a federation, comprising:
a splitter that identifies a zone including a federation of data sources, splits the zone into disjoint sets of data sources, and for each disjoint set of data sources, assigns the respective disjoint set of data sources to a zone subset;
an assignment module that assigns, by one or more hardware processors, each client of a set of clients to at most one zone subset; and
a federation engine that receives a federated query from a client, determines an assigned zone subset to which the client is assigned, and submits the federated query to the assigned zone subset, wherein the federated query includes a plurality of source queries, and each source query of the plurality of source queries is specific to an autonomous data source belonging to the federation, and wherein the plurality of source queries is submitted to one or more data sources in the assigned zone subset.

14. The system of claim 13, further comprising:
a merger that merges the disjoint sets of data sources in each of the zone subsets into a single zone.

15. The system of claim 14, wherein the merger identifies a set of data sources in the single zone having updated data since the zone was split, wherein a first data source in the set of data sources propagates updated data to a second data source in the single zone, and wherein the second data source stores the updated data.

16. The system of claim 13, wherein the federated query is a write query that is submitted to each of the data sources in the assigned zone subset.

17. The system of claim 13, wherein the federated query is a read query.

18. The system of claim 13, wherein the federated query is a hard read query that is submitted to each of the data sources in the disjoint sets.

19. The system of claim 13, wherein for each of the submitted source queries of the plurality of source queries, the federation engine receives a result of the respective source query, determines a final result based on the one or more received results, and sends the final result to the client.

20. A non-transitory machine-readable medium comprising a plurality of machine-readable instructions that when executed by one or more processors is adapted to cause the one or more processors to perform a method comprising:
splitting a zone into a plurality of zone subsets, the zone including a plurality of data sources belonging to a federation, and the plurality of zone subsets having disjoint sets of data sources belonging to the federation;
receiving a federated query from a client, the federated query including a plurality of source queries, and each source query of the plurality of source queries being specific to an autonomous data source belonging to the federation;
determining the client's assigned zone subset of the plurality of zone subsets; and
submitting the federated query to the client's assigned zone subset, wherein the plurality of source queries is submitted to one or more data sources in the client's assigned zone subset.

* * * * *